United States Patent
Lee et al.

(10) Patent No.: US 10,568,115 B2
(45) Date of Patent: Feb. 18, 2020

(54) METHOD AND APPARATUS FOR TERMINAL SELF-RESELECTING RESOURCE BASED ON PRIORITY IN WIRELESS COMMUNICATION SYSTEM

(71) Applicant: LG Electronics Inc., Seoul (KR)

(72) Inventors: Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/458,715

(22) Filed: Jul. 1, 2019

(65) Prior Publication Data

US 2019/0327753 A1    Oct. 24, 2019

Related U.S. Application Data

(63) Continuation of application No. 16/318,349, filed as application No. PCT/KR2017/010734 on Sep. 27, 2017.

(Continued)

(51) Int. Cl.
*H04W 72/12* (2009.01)
*H04W 36/06* (2009.01)
(Continued)

(52) U.S. Cl.
CPC ....... *H04W 72/1242* (2013.01); *H04L 1/1819* (2013.01); *H04W 4/40* (2018.02); *H04W 28/26* (2013.01); *H04W 36/06* (2013.01); *H04W 72/14* (2013.01); *H04W 76/27* (2018.02); *H04W 80/02* (2013.01); *H04W 92/18* (2013.01)

(58) Field of Classification Search
None
See application file for complete search history.

(56) References Cited

U.S. PATENT DOCUMENTS

2014/0094183 A1    4/2014  Gao et al.
2016/0094975 A1*   3/2016  Sheng ............... H04W 72/042
                                                      370/216

(Continued)

OTHER PUBLICATIONS

3GPP. TS23.303 v13.4.0, "UMTS; LTE; ProSe; Stage 2" (Year: 2016).*
3GPP. TS 36.321 v13.2.1 "LTE; E-UTRA; MAC protocol Specification" (Year: 2016).*
3GPP. TSG RAN WG1 Meeting #83 R1-156978. System level consideration and evaluation for V2V communication (Year: 2015).*
3GPP. TS 24.334 v13.3.1 R13. UMTS; LTE; ProSe UE to ProSe function protocol aspects; stage3; (Year: 2016).*

(Continued)

*Primary Examiner* — Jeffrey M Rutkowski
*Assistant Examiner* — Andre Tacdiran
(74) *Attorney, Agent, or Firm* — Fish & Richardson P.C.

(57) ABSTRACT

Suggested is a novel condition for a media access control (MAC) entity in user equipment (UE) reselecting a sidelink resource in a wireless communication system. The MAC entity of the UE can reselect a sidelink resource when a configured sidelink grant does not satisfy a latency requirement according to ProSe per-packet priority (PPPP). More particularly, configuration is performed by an upper layer so that the MAC entity transmits on the basis of sensing using a resource pool; the MAC entity selects generation of a configured sidelink grant corresponding to transmission of a plurality of MAC protocol data units (PDU); and when data is available in a sidelink traffic channel (STCH) and the configured sidelink grant does not satisfy the latency requirement according to the PPPP, a sidelink resource is reselected.

18 Claims, 5 Drawing Sheets

Related U.S. Application Data

(60) Provisional application No. 62/402,074, filed on Sep. 30, 2016, provisional application No. 62/402,059, filed on Sep. 30, 2016.

(51) Int. Cl.

| | | |
|---|---|---|
| *H04W 28/26* | (2009.01) | |
| *H04W 76/27* | (2018.01) | |
| *H04L 1/18* | (2006.01) | |
| *H04W 92/18* | (2009.01) | |
| *H04W 4/40* | (2018.01) | |
| *H04W 72/14* | (2009.01) | |
| *H04W 80/02* | (2009.01) | |

(56) References Cited

U.S. PATENT DOCUMENTS

| | | | | |
|---|---|---|---|---|
| 2016/0219620 | A1* | 7/2016 | Lee | H04W 72/14 |
| 2017/0303319 | A1* | 10/2017 | Han | H04W 4/70 |
| 2018/0054237 | A1* | 2/2018 | Tseng | H04W 72/085 |
| 2018/0069618 | A1* | 3/2018 | Loehr | H04B 7/15542 |
| 2018/0213438 | A1* | 7/2018 | Muraoka | H04W 28/06 |
| 2018/0255499 | A1* | 9/2018 | Loehr | H04B 7/2606 |
| 2018/0263026 | A1* | 9/2018 | Loehr | H04W 72/0406 |
| 2019/0045521 | A1* | 2/2019 | Hong | H04W 72/1205 |
| 2019/0124015 | A1* | 4/2019 | Loehr | H04L 69/321 |
| 2019/0174503 | A1* | 6/2019 | Adachi | H04W 4/021 |

OTHER PUBLICATIONS

Intel Corporation, "Transmitter behavior for sidelink resource (re)selection," R1-166512, 3GPP TSG RAN WG1 Meeting #86, Gothenburg, Sweden, Aug. 22-26, 2016, 8 pages.

Intel Corporationl, "Sidelink measurements for V2V sensing and resource re-selection," R1-166511, 3GPP TSG RAN WG1 Meeting #86, Gothenburg, Sweden, Aug. 22-26, 2016, 7 pages.

LG Electronics Inc., "Support for V2V services based on LTE sidelink," R2-165839, 3GPP TSG-RAN WG2 Meeting #95, Gothenburg, Sweden, Aug. 22-26, 2016, 22 pages.

Intel Corporation, "On timing relationship between sensing window, packet arrival, resource reselection trigger, PSCCH and PSSCH transmissions," R1-166513, 3GPP TSG RAN WG1 Meeting #86, Gothenburg, Sweden, Aug. 22-26, 2016, 8 pages.

RAN WG1, "LS on RAN1 agreements in sidelink-based V2V, " R2-164650, 3GPP TSG RAN WG2 Meeting #95, Gothenburg, Sweden, Aug. 22-26, 2016, 5 pages.

Huawei, HiSilicon, "Support of QoS for PC5-based V2X transport," R2-164917, 3GPP TSG-RAN WG2 Meeting #95, Gothenburg, Sweden, dated Aug. 22-26, 2016, 6 pages.

Qualcomm Incorporated, "QoS for V2X Communication over PC5," R2-166736, 3GPP TSG-RAN WG2 Meeting #95bis, Kaohsuing, dated Oct. 10-14, 2016, 3 pages.

LG Electronics Inc., "UE autonomous resource selection mode in MAC CR," R2-165690, 3GPP TSG-RAN WG2 #95, Gothenburg, Sweden, dated Aug. 22-26, 2016, 6 pages.

\* cited by examiner

METHOD AND APPARATUS FOR TERMINAL SELF-RESELECTING RESOURCE BASED ON PRIORITY IN WIRELESS COMMUNICATION SYSTEM

CROSS-REFERENCE TO RELATED APPLICATIONS

This application is a continuation of U.S. application Ser. No. 16/318,349, filed on Jan. 16, 2019, which is the National Stage filing under 35 U.S.C. 371 of International Application No. PCT/KR2017/010734, filed on Sep. 27, 2017, which claims the benefit of U.S. Provisional Applications No. 62/402,059 filed on Sep. 30, 2016, and No. 62/402,074 filed on Sep. 30, 2016, the contents of which are all hereby incorporated by reference herein in their entirety

BACKGROUND OF THE INVENTION

Field of the Invention

The present invention relates to wireless communications and, more particularly, to a method and apparatus for reselecting a resource autonomously based on a priority in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization.

A user equipment is able to select a sidelink (SL) resource for V2X communication by itself in a resource pool configured by a network. Thus, a method for selecting or reselecting an SL resource for V2X communication needs to be discussed.

SUMMARY OF THE INVENTION

The present invention provides a method and apparatus for reselecting a resource autonomously based on a priority in a wireless communication system. The present invention provides a method and apparatus for enabling a user equipment to select and/or reselect a sidelink (SL) resource for vehicle-to-everything (V2X) communication autonomously based on a latency requirement dependent upon a ProSe per-packet priority (PPPP).

In an aspect, a method for reselecting a sidelink resource by a media access control (MAC) entity of a user equipment (UE) in a wireless communication system is provided. The method includes selecting to configure a sidelink grant corresponding to transmissions of multiple MAC protocol data units (PDUs), determining that there is data for a vehicle-to-everything (V2X) communication in a sidelink traffic channel (STCH), determining that the configured sidelink grant cannot fulfil a latency requirement according to a ProSe per-packet priority (PPPP), and reselecting the sidelink resource. The MAC entity is configured by an upper layer to transmit based on sensing by using a resource pool.

The reselecting the sidelink resource may be performed for each sidelink process configured for multiple transmissions based on sensing.

The reselecting the sidelink resource may include clearing the configured sidelink grant. The reselecting the sidelink resource may include randomly selecting, with equal probability, an integer value in an interval between 5 and 15, and setting a value of a sidelink resource reselection counter to the selected integer value. The reselecting the sidelink resource may include selecting a number of hybrid automatic repeat request (HARD) retransmissions from allowed numbers configured by the upper layer in allowedRetxNumberPSSCH, and an amount of frequency resources within the range configured by the upper layer between minRB-NumberPSSCH and maxRB-NumberPSSCH. The reselecting the sidelink resource may include selecting an integer value in an interval between 1 and 10 from allowed values configured by the upper layer in restrictResourceReservationPeriod, and setting a resource reservation interval by multiplying 100 with the selected integer value. The reselecting the sidelink resource may include randomly selecting time and frequency resources for transmission opportunities of sidelink control information (SCI) and sidelink shared channel (SL-SCH) corresponding to a number of transmissions of MAC PDUs with the resource reservation interval from the resource pool, excluding resources indicated by a physical layer.

The upper layer may be a radio resource control (RRC) layer of the UE.

In another aspect, a user equipment (UE) in a wireless communication system is provided. The UE includes a memory, a transceiver, and a processor, operably coupled to the memory and the transceiver, that selects to configure a sidelink grant corresponding to transmissions of multiple media access control (MAC) protocol data units (PDUs), determines that there is data for a vehicle-to-everything (V2X) communication in a sidelink traffic channel (STCH), determines that the configured sidelink grant cannot fulfil a latency requirement according to a ProSe per-packet priority (PPPP), and reselects a sidelink resource. A MAC entity of the UE is configured by an upper layer to transmit based on sensing by using a resource pool.

A UE is capable of efficiently selecting and/or reselecting an SL resource for V2X communication.

DESCRIPTION OF EXEMPLARY EMBODIMENTS

Figure 1:
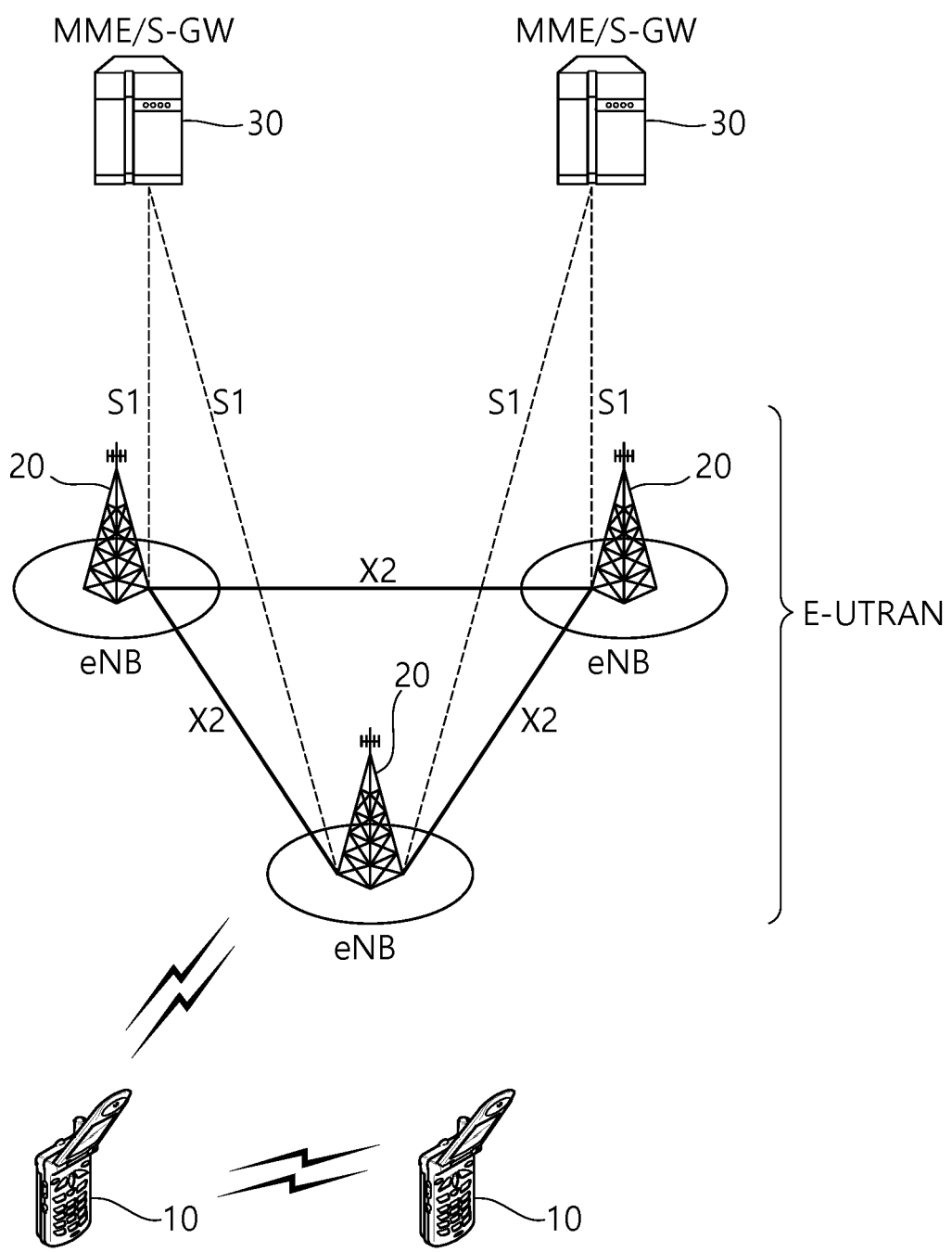
FIG. 1 shows 3GPP LTE system architecture.

FIG. 1 shows 3GPP LTE system architecture. Referring to FIG. 1, the 3GPP long-term evolution (LTE) system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
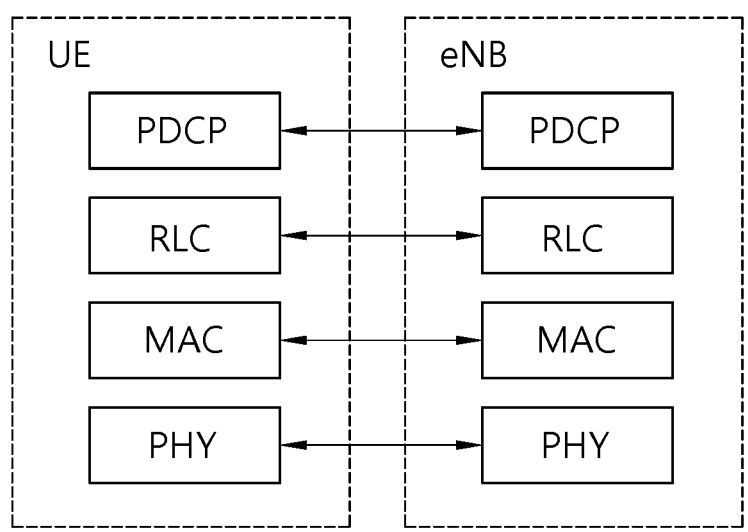
FIG. 2 shows a block diagram of a user plane protocol stack of an LTE system.
Figure 3:
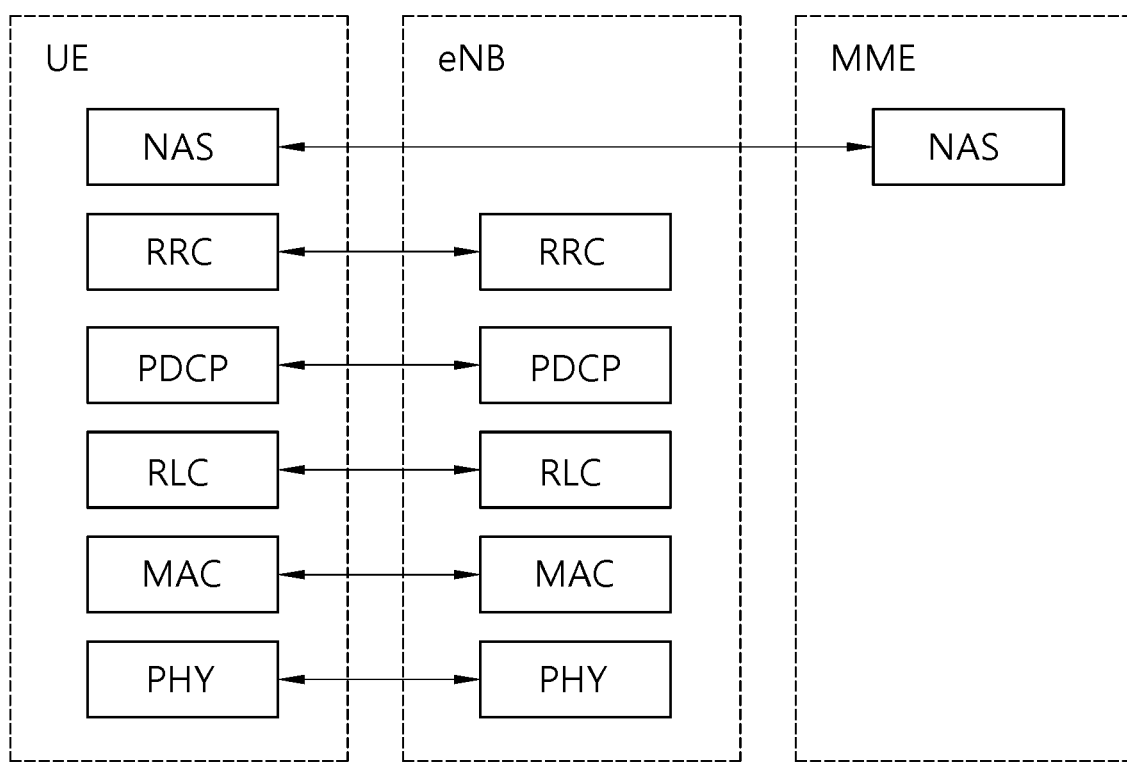
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change in order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Sidelink is described. Sidelink is a UE to UE interface for sidelink communication and sidelink discovery. The Sidelink corresponds to the PC5 interface. Sidelink communication is AS functionality enabling proximity-based services (ProSe) direct communication, between two or more nearby UEs, using E-UTRA technology but not traversing any network node. Sidelink discovery is AS functionality enabling ProSe direct discovery, using E-UTRA technology but not traversing any network node.

Sidelink physical channels include a physical sidelink broadcast channel (PSBCH) carrying system and synchronization related information, transmitted from the UE, a physical sidelink discovery channel (PSDCH) carrying sidelink discovery message from the UE, a physical sidelink control channel (PSCCH) carrying control from a UE for sidelink communication, and a physical sidelink shared channel (PSSCH) carrying data from a UE for sidelink communication. The sidelink physical channels are mapped to sidelink transport channels. The PSBCH is mapped to a sidelink broadcast channel (SL-BCH). The PSDCH is mapped to a sidelink discovery channel (SL-DCH). The PSSCH is mapped to a sidelink shared channel (SL-SCH).

In sidelink, the logical channels are also classified into control channels for transferring control plane information and traffic channels for transferring user plane information. The sidelink control channels include a sidelink broadcast control channel (SBCCH) which is a sidelink channel for broadcasting sidelink system information from one UE to other UE(s). The SBCCH is mapped to the SL-BCH. The sidelink traffic channels include a sidelink traffic channel (STCH) which is a point-to-multipoint channel, for transfer of user information from one UE to other UE(s). The STCH is mapped to the SL-SCH. This channel is used only by sidelink communication capable UEs.

Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

The UE supporting sidelink communication can operate in the following two modes for resource allocation. The first mode is a scheduled resource allocation. The scheduled resource allocation may be called Mode 1. In mode 1, the UE needs to be RRC_CONNECTED in order to transmit data. The UE requests transmission resources from the eNB. The eNB schedules transmission resources for transmission of sidelink control information (SCI) and data. The UE sends a scheduling request (dedicated scheduling request (D-SR) or random access) to the eNB followed by a sidelink buffer status report (BSR). Based on the Sidelink BSR, the eNB can determine that the UE has data for a sidelink communication transmission and estimate the resources needed for transmission. The eNB can schedule transmission resources for sidelink communication using configured sidelink radio network temporary identity (SL-RNTI).

The second mode is a UE autonomous resource allocation. The UE autonomous resource allocation may be called Mode 2. In mode 2, a UE on its own selects resources from resource pools and performs transport format selection to transmit sidelink control information and data. There can be up to 8 transmission pools either pre-configured for out of coverage operation or provided by RRC signalling for in-coverage operation. Each pool can have one or more Prose per-packet priority (PPPP) associated with it. For transmission of a MAC protocol data unit (PDU), the UE selects a transmission pool in which one of the associated PPPP is equal to the PPPP of a logical channel with highest PPPP among the logical channel identified in the MAC PDU. There is a one to one association between sidelink control pool and sidelink data pool. Once the resource pool is selected, the selection is valid for the entire sidelink control period. After the sidelink control period is finished, the UE may perform resource pool selection again.

A UE is considered in-coverage for sidelink communication whenever it detects a cell on a public safety ProSe carrier. If the UE is out of coverage for sidelink communication, it can only use Mode 2. If the UE is in coverage for sidelink communication, it may use Mode 1 or Mode 2 as per eNB configuration. If the UE is in coverage for sidelink communication, it shall use only the resource allocation mode indicated by eNB configuration unless one of the exceptional cases occurs. When an exceptional case occurs, the UE is allowed to use Mode 2 temporarily even though it was configured to use Mode 1. Resource pool to be used during exceptional case may be provided by eNB.

The cell on the public safety ProSe carrier may select one of the following two options. First, the cell on the public safety ProSe carrier may provide a transmission resource pool for Mode 2 in SIB18. UEs that are authorized for sidelink communication may use these resources for sidelink communication in RRC_IDLE in the cell on the same carrier (i.e. public safety ProSe carrier). UEs that are authorized for sidelink communication may use these resources for sidelink communication in RRC_IDLE or RRC_CONNECTED in a cell on another carrier.

Alternatively, the cell on the public safety ProSe carrier may indicate in SIB18 that it supports sidelink communication but does not provide transmission resources. UEs need to enter RRC_CONNECTED to perform sidelink communication transmission. In this case the cell on the public safety ProSe carrier may provide in broadcast signalling an exceptional transmission resource pool for Mode 2, to be used by the UE in exceptional cases. A UE in RRC_CONNECTED that is authorized to perform sidelink communication transmission indicates to the serving eNB that it wants to perform sidelink communication transmissions. The eNB validates whether the UE is authorized for sidelink communication transmission using the UE context received from MME. The eNB may configure a UE by dedicated signalling with a transmission resource pool for Mode 2 that may be used without constraints while the UE is in RRC_CONNECTED. Alternatively, the eNB may configure a UE to use the exceptional transmission resource pool for Mode 2 which the UE is allowed to use only in exceptional cases, and rely on Mode 1 otherwise.

A set of transmission and reception resource pools for sidelink control information when the UE is out of coverage for sidelink communication is pre-configured in the UE. The resource pools for sidelink control information when the UE is in coverage for sidelink communication are configured as below. The resource pools used for reception are configured by the eNB via RRC, in broadcast signaling. The resource pool used for transmission is configured by the eNB via RRC, in dedicated or broadcast signaling, if Mode 2 is used. The resource pool used for transmission is configured by the eNB via RRC, in dedicated signaling if Mode 1 is used. The eNB schedules the specific resource(s) for sidelink control information transmission within the configured reception pools.

A set of transmission and reception resource pools for data when the UE is out of coverage for sidelink communication is pre-configured in the UE. The resource pools for data when the UE is in coverage for sidelink communication are configured as below. The resource pools used for transmission and reception are configured by the eNB via RRC, in dedicated or broadcast signaling, if Mode 2 is used. There is no resource pool for transmission and reception if Mode 1 is used.

Sidelink discovery is defined as the procedure used by the UE supporting sidelink discovery to discover other UE(s) in its proximity, using E-UTRA direct radio signals via PC5. Sidelink discovery is supported both when UE is served by EUTRAN and when UE is out of EUTRA coverage. Only ProSe-enabled public safety UE can perform sidelink discovery when it is out of EUTRA coverage. For public safety sidelink discovery, the allowed frequency is pre-configured in the UE, and is used even when UE is out of coverage of E-UTRA in that frequency. The pre-configured frequency is the same frequency as the public safety ProSe carrier.

There are two types of resource allocation for discovery message announcement. The first type is a UE autonomous resource selection, which is a resource allocation procedure where resources for announcing of discovery message are allocated on a non UE specific basis. The UE autonomous resource selection may be called Type 1. In Type 1, the eNB provides the UE(s) with the resource pool configuration used for announcing of discovery message. The configuration may be signaled in broadcast or dedicated signaling. The UE autonomously selects radio resource(s) from the indicated resource pool and announces discovery message. The UE can announce discovery message on a randomly selected discovery resource during each discovery period.

The second is a scheduled resource allocation, which is a resource allocation procedure where resources for announcing of discovery message are allocated on per UE specific basis. The scheduled resource allocation may be called Type 2. In Type 2, the UE in RRC_CONNECTED may request resource(s) for announcing of discovery message from the eNB via RRC. The eNB assigns resource(s) via RRC. The resources are allocated within the resource pool that is configured in UEs for announcement.

For UEs in RRC_IDLE, the eNB may select one of the following options. The eNB may provide resource pools for Type 1 based discovery message announcement in SIB19. UEs that are authorized for sidelink discovery use these resources for announcing discovery message in RRC_IDLE. Or, the eNB may indicate in SIB19 that it supports sidelink discovery but does not provide resources for discovery message announcement. UEs need to enter RRC_CONNECTED in order to request resources for discovery message announcement.

For UEs in RRC_CONNECTED, a UE authorized to perform sidelink discovery announcement indicates to the eNB that it wants to perform sidelink discovery announcement. A UE can also indicate to the eNB the frequency(s) in which sidelink discovery announcement is desired. The eNB validates whether the UE is authorized for sidelink discovery announcement using the UE context received from MME. The eNB may configure the UE with resource pool for Type 1 for discovery message announcement via dedicated signaling. The eNB may configure resource pool along with dedicated resource in the form of time and frequency indices for discovery message announcement via dedicated RRC signaling. The resources allocated by the eNB via dedicated signaling are valid until the eNB re-configures the resource(s) by RRC signaling or, the UE enters RRC_IDLE.

Authorized receiving UEs in RRC_IDLE and RRC_CONNECTED monitor resource pools used for Type 1 and resource pools for Type 2. The eNB provides the resource pool configuration used for discovery message monitoring on intra frequency, inter frequency of same or different PLMNs cells in RRC signaling (SIB19). The RRC signaling (SIB19 or dedicated) may contain detailed sidelink discovery configuration used for announcement of sidelink discovery in cells of intra-frequency, inter-frequency of same or different PLMNs.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

In V2X communication, messages such as common awareness messages (CAM), decentralized environmental notification messages (DENM), or basic safety messages (BSM) may be transmitted. The CAM includes information on a vehicle's type, a location, speed, a direction, etc., and may be periodically broadcasted by any vehicle. The DENM includes information on a type of a particular event and an area where the particular event has occurred, and may be broadcasted by an RSU or a vehicle. The BSM is included in the U.S. J2735 basic safety message, and have similar characteristics to those of the CAM. Through the BSM, an emergency brake warning, a front collision warning, an intersection safety support, a blind spot and line departure warning, a overtake warning, an out-of-control warning service may be provided.

The UE may autonomously select the SL resource for V2X communication within the resource pool configured by the network. That is, the UE may select autonomously the SL resource for V2X communication in Mode 2 and perform V2X communication via the corresponding SL resource. However, SL resources for V2X communication may be selected based on sensing. More specifically, the UE may perform sensing for (re)-selection of SL resources. Based on the sensing result, the UE may (re)-select a specific SL resource and may reserve a plurality of SL resources. UE autonomous resource selection based on sensing for V2X communication may be referred to as SL mode 4.

SL grant reception and SCI transmission according to the conventional art are described in detail. In order to transmit on the SL-SCH, the MAC entity must have at least one sidelink grant. Sidelink grants are selected as follows for sidelink communication.

1> if the MAC entity is configured to receive a single sidelink grant dynamically on the PDCCH and more data is available in STCH than can be transmitted in the current SC period, the MAC entity shall:

2> using the received sidelink grant determine the set of subframes in which transmission of SCI and transmission of first transport block occur;

2> consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;

2> clear the configured sidelink grant at the end of the corresponding SC Period;

1> else, if the MAC entity is configured by upper layers to receive multiple sidelink grants dynamically on the PDCCH and more data is available in STCH than can be transmitted in the current SC period, the MAC entity shall for each received sidelink grant:

2> using the received sidelink grant determine the set of subframes in which transmission of SCI and transmission of first transport block occur;

2> consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;

2> clear the configured sidelink grant at the end of the corresponding SC Period;

1> else, if the MAC entity is configured by upper layers to transmit using one or multiple pool(s) of resources and more data is available in STCH than can be transmitted in the current SC period, the MAC entity shall for each sidelink grant to be selected:

2> if configured by upper layers to use a single pool of resources:

3> select that pool of resources for use;

2> else, if configured by upper layers to use multiple pools of resources:

3> select a pool of resources for use from the pools of resources configured by upper layers whose associated priority list includes the priority of the highest priority of the sidelink logical channel in the MAC PDU to be transmitted;

2> randomly select the time and frequency resources for SL-SCH and SCI of a sidelink grant from the selected resource pool. The random function shall be such that each of the allowed selections can be chosen with equal probability;

2> consider the selected sidelink grant to be a configured sidelink grant occurring in those subframes starting at the beginning of the first available SC Period which starts at least 4 subframes after the subframe in which the sidelink grant was selected;

2> clear the configured sidelink grant at the end of the corresponding SC Period;

Sidelink grants are selected as follows for V2X sidelink communication.

1> if the MAC entity is configured to receive a sidelink grant dynamically on the PDCCH and data is available in STCH, the MAC entity shall:

2> using the received sidelink grant determine the number of HARQ retransmissions and the set of subframes in which transmission of SCI and transmission of a transport block occur;

2> consider the received sidelink grant to be a configured sidelink grant;

1> else, if the MAC entity is configured by upper layers to transmit based on sensing using a pool of resources, the MAC entity selects to create a configured sidelink grant corresponding to transmissions of multiple MAC PDUs, and data is available in STCH, the MAC entity shall for each Sidelink process configured for multiple transmissions based on sensing:

2> if SL_RESOURCE_RESELECTION_COUNTER=0 and the MAC entity randomly selects, with equal probability, a value in the interval [0, 1] which is above the probability configured by upper layers in probResourceKeep; or 2> if the configured sidelink grant cannot accommodate a RLC service data unit (SDU) by using the maximum allowed MCS configured by upper layers in maxMCS-PSSCH and the MAC entity selects not to segment the RLC SDU; or 2> if a pool of resources is configured or reconfigured by upper layers:

3> clear the configured sidelink grant, if available;

3> randomly select, with equal probability, an integer value in the interval [5, 15] and set SL_RESOURCE_RESELECTION_COUNTER to the selected value;

3> select the number of HARQ retransmissions from the allowed numbers configured by upper layers in allowedRebcNumberPSSCH, and an amount of frequency resources within the range configured by upper layers between minRB-NumberPSSCH and maxRB-NumberPSSCH;

3> select an integer value in the interval [1, 10] from the allowed values configured by upper layers in restrictResourceReservationPeriod and set the resource reservation interval by multiplying 100 with the selected value;

3> randomly select the time and frequency resources for transmission opportunities of SCI and SL-SCH corresponding to the number of transmissions of MAC PDUs with the resource reservation interval from the resource pool, excluding the resources indicated by the physical layer. The random function shall be such that each of the allowed selections can be chosen with equal probability;

3> if the number of HARQ retransmissions is equal to 1 and there are available resources, except the resources already excluded by the physical layer:

4> randomly select the time and frequency resources for the other transmission opportunities of SCI and SL-SCH corresponding to the number of additional transmissions of the MAC PDUs with the resource reservation interval from the available resources. The random function shall be such that each of the allowed selections can be chosen with equal probability;

4> consider a set of transmission opportunities which comes first in time as the selected sidelink grant and a set of transmission opportunities which comes later in time as the retransmission opportunities;

3> else:

4> consider the set as the selected sidelink grant;

3> use the selected sidelink grant to determine the set of subframes in which transmissions of SCI and SL-SCH;

3> consider the selected sidelink grant to be a configured sidelink grant;

2> else if SL_RESOURCE_RESELECTION_COUNTER=0 and the MAC entity randomly selects, with equal probability, a value in the interval [0, 1] which is less than or equal to the probability configured by upper layers in probResourceKeep:

3> clear the configured sidelink grant, if available;

3> randomly select, with equal probability, an integer value in the interval [5, 15] and set SL_RESOURCE_RESELECTION_COUNTER to the selected value;

3> use the previously selected sidelink grant for the number of transmissions of the MAC PDUs with the resource reservation interval to determine the set of subframes in which transmissions of SCI and SL-SCH occur;

3> consider the selected sidelink grant to be a configured sidelink grant;

1> else, if the MAC entity is configured by upper layers to transmit based on either sensing or random selection using a pool of resources, the MAC entity selects to create a configured sidelink grant corresponding to transmission(s) of a single MAC PDU, and data is available in STCH, the MAC entity shall for a Sidelink process:

2> select the number of HARQ retransmissions from the allowed numbers configured by upper layers in allowedRetxNumberPSSCH, and an amount of frequency resources within the range configured by upper layers between minRB-NumberPSSCH and maxRB-NumberPSSCH;

2> if transmission based on random selection is configured by upper layers:

3> randomly select the time and frequency resources for one transmission opportunity of SCI and SL-SCH from the resource pool. The random function shall be such that each of the allowed selections can be chosen with equal probability;

2> else:

3> randomly select the time and frequency resources for one transmission opportunity of SCI and SL-SCH from the resource pool, excluding the resources indicated by the physical layer. The random function shall be such that each of the allowed selections can be chosen with equal probability;

2> if the number of HARQ retransmissions is equal to 1:

3> if transmission based on random selection is configured by upper layers and there are available resources for more transmission opportunity:

4> randomly select the time and frequency resources for the other transmission opportunity of SCI and SL-SCH corresponding to additional transmission of the MAC PDU from the available resources. The random function shall be such that each of the allowed selections can be chosen with equal probability;

3> else, if transmission based on sensing is configured by upper layers and there are available resources, except the resources already excluded by the physical layer, for more transmission opportunity:

4> randomly select the time and frequency resources for the other transmission opportunity of SCI and SL-SCH corresponding to additional transmission of the MAC PDU from the available resources. The random function shall be such that each of the allowed selections can be chosen with equal probability;

3> consider a transmission opportunity which comes first in time as the selected sidelink grant and a transmission opportunity which comes later in time as the retransmission opportunity;

2> else:

3> consider the transmission opportunity as the selected sidelink grant;

2> use the selected sidelink grant to determine the subframes in which transmission(s) of SCI and SL-SCH occur;

2> consider the selected sidelink grant to be a configured sidelink grant;

The MAC entity shall for each subframe:

1> if the MAC entity has a configured sidelink grant occurring in this subframe:

> if the configured sidelink grant corresponds to transmission of SCI:

3> instruct the physical layer to transmit SCI corresponding to the configured sidelink grant;

3> for V2X sidelink communication, deliver the configured sidelink grant and the associated HARQ information to the Sidelink HARQ Entity for this subframe;

2> else if the configured sidelink grant corresponds to transmission of first transport block for sidelink communication:

3> deliver the configured sidelink grant and the associated HARQ information to the Sidelink HARQ Entity for this subframe.

There is ongoing discussion concerning selection or reselection of an SL resource.

Hereinafter, various aspects of an SL resource for V2X communication according to various embodiments of the present invention will be described.

1. Procedure for (Re)Selecting One Resource for Each SL Process

According to the above-described conventional method for SL grant reception and SCI transmission, resource reselection is used to allocate multiple transmission opportunities of SCI and SL-SCH. If resource reselection is triggered, a UE allocates multiple transmission opportunities as below.

1) Step 1: The UE selects a value of SL_RESOURCE_RESELECTION_COUNTER between [5, 15].

2) Step 2: The UE selects an integer value between [1, 10] and sets a resource reservation period by multiplying the selected value by 100. In this step, the UE is likely to set a resource reservation period according to an actual message transmission period from among 100 ms, 200 ms . . . 1000 ms.

3) Step 3: The UE randomly select a time resource and a frequency resource for multiple transmission opportunities, together with a resource reservation period, from a resource pool. In this step, whenever SL_RESOURCE_RESELECTION_COUNTER is 0, a SL may be reselected. Thus, if the resource reservation period is 100 ms, the SL resource is ideally allocated up to SL_RESOURCE_RESELECTION_COUNTER at an interval of 100 ms.

This resource allocation mechanism is intended to support an actual V2X traffic pattern (for example, a V2X message periodically generated at an interval of 100 ms). This mechanism is substantially similar to semi-persistent scheduling (SPS) allocation. SPS may operate for each logical channel or each PPPP. Thus, even associating one resource (re)selecting procedure with one logical channel or one PPPP is possible.

As described above, it may be considered that one resource (re)selecting procedure is associated with transmission of a plurality of MAC PDUs for one SL process. According to an embodiment of the present invention, it may be suggested to associate one resource (re)selecting procedure with one logical channel or one PPPP for transmission of the plurality of MAC PDUs. To this end, the following options may be considered.

1) Option 1: One (re)selecting procedure may be associated with one logical channel or one PPPP. In this option, an MAC entity may select generating a configured SL grant corresponding to transmission of a plurality of MAC PDUs for an STCH (or an STCH associated with one PPPP). The MAC entity may inspect whether data is available in the STCH. The MAC entity may perform multiple transmission procedures for each STCH (or each PPPP). According to Option 1, the conventional SL reception and legacy SCI transmission may be changed as shown in Table 1.

TABLE 1

. . .
1> else, if the MAC entity is configured by upper layers to transmit based on sensing using a pool of resources, the MAC entity selects to create a configured sidelink grant corresponding to transmissions of multiple MAC PDUs for a STCH (or for STCH(s) associated with one PPPP), and data is available in the STCH, the MAC entity shall for each STCH (or PPPP) configured for multiple transmissions based on sensing:
. . .

2) Option 2: One logical channel or one PPPP may be associated with one SL process. In this option, the MAC entity may select generating a configured SL grant corresponding to transmission of a plurality of MAC PDUs for an SL process. The MAC entity may inspect if data is available in an STCH associated with the SL procedure. The MAC entity may perform a plurality of transmission procedures for each SL process. According to Option 2, the conventional method for SL grant reception and SCI transmission may be changed as shown in Table 2.

TABLE 2

. . .
1> else, if the MAC entity is configured by upper layers to transmit based on sensing using a pool of resources, the MAC entity selects to create a configured sidelink grant corresponding to transmissions of multiple MAC PDUs for a Sidelink process, and data is available in a STCH associated with this Sidelink process, the MAC entity shall for each Sidelink process configured for multiple transmissions based on sensing:
. . .

2. Resource Reselection in Consideration of Latency Requirement According to PPPP Packet delay budget (PDB) may be considered as a latency requirement from an application layer (that is, 20 ms or 100 ms). The latency may be derived from PPPP by the AS layer, which is based on the mapping between the PPPP and latency provided by configuration.

In multiple transmissions in SL mode 4, the UE allocates a time resource and a frequency resource from a resource pool selected for periodic transmission of a V2X message (which is, for example, occurs every 500 ms). Meanwhile, a time to periodically generate a V2X message may be adjusted. Due to the change of the message generation time, an allocated periodic resource may fail to satisfy the latency requirement (20 ms or 100 ms).

For example, if a CAM generating time is adjusted by +150 ms with respect to the same period (for example, 500 ms), the UE needs to reselect a time resource and a frequency resource from a selected resource pool during 500 ms. Alternatively, if the CAM generating period is changed from 500 ms to 1000 ms, the UE needs to reselect a time resource and a frequency resource from a resource pool selected according to a new period.

The UE may know a latency requirement from a PPPP associated with an STCH. Thus, in order to appropriately satisfy a latency requirement for multiple transmissions of SL mode 4, the UE needs to be able to reselect a resource. Thus, according to an embodiment of the present invention, it may be suggested that a latency requirement derived from the PPPP is considered as a resource reselection trigger condition. That is, if an SL grant fails to satisfy a latency requirement from a PPPP associated with an MAC PDU (or associated with an STCH), reselection may be triggered. Accordingly, the conventional method for SL grant reception and SCI transmission may be changed as shown in Table 3.

TABLE 3

. . .
1> else, if the MAC entity is configured by upper layers to transmit based on sensing using a pool of resources, the MAC entity selects to create a configured sidelink grant corresponding to transmissions of multiple MAC PDUs, and data is available in STCH, the MAC entity shall for each Sidelink process configured for multiple transmissions based on sensing:
2> if SL_RESOURCE_RESELECTION_COUNTER = 0 and the MAC entity randomly selects, with equal probability, a value in the interval which is above the probability configured by upper layers in probResourceKeep; or
2> if the configured sidelink grant cannot accommodate a RLC SDU by using the maximum allowed MCS configured by upper layers in maxMCS-PSSCH and the MAC entity selects not to segment the RLC SDU; or
2> if the configured sidelink grant cannot meet the latency requirement according to the PPPP associated with a MAC PDU (or associated with the STCH); or
2> if a pool of resources is configured or reconfigured by upper layers:
3> clear the configured sidelink grant, if available;
3> randomly select, with equal probability, an integer value in the interval [5, 15] and set SL_RESOURCE_RESELECTION_COUNTER to the selected value;
3> select the number of HARQ retransmissions from the allowed numbers configured by upper layers in allowedRebcNumberPSSCH, and an amount of frequency resources within the range configured by upper layers between minRB-NumberPSSCH and maxRB-NumberPSSCH;
3> select an integer value in the interval [1, 10] from the allowed values configured by upper layers in restrictResourceReservationPeriod and set the resource reservation interval by multiplying 100 with the selected value;
3> randomly select the time and frequency resources for transmission opportunities of SCI and SL-SCH corresponding to the number of transmissions of MAC PDUs with the resource reservation interval from the resource pool, excluding the resources indicated by the physical layer. The random function shall be such that each of the allowed selections can be chosen with equal probability;
. . .

Figure 4:
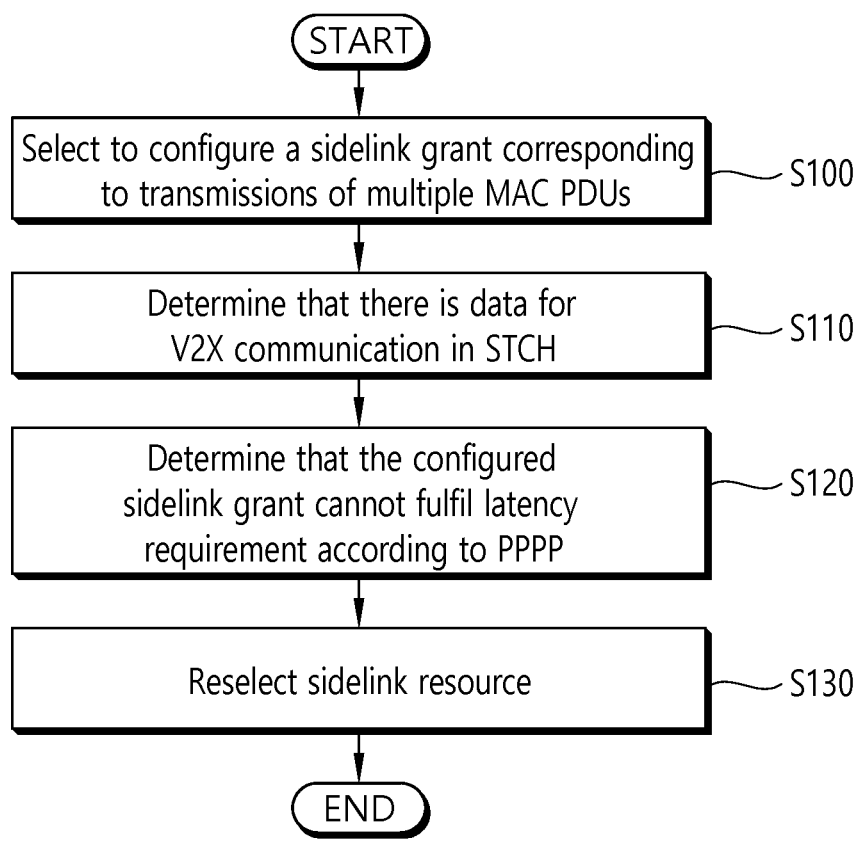
FIG. 4 shows a method for reselecting an SL resource by an MAC entity of a UE according to an embodiment of the present invention.

FIG. 4 shows a method for reselecting an SL resource by an MAC entity of a UE according to an embodiment of the present invention.

In step S100, the MAC entity of the UE selects to configure a sidelink grant corresponding to transmission of multiple MAC PDUs. In step S110, the MAC entity of the UE determines that there is data for V2X communication in an STCH. The MAC entity is configured by a higher layer to transmit based on sensing using a resource pool. The higher layer may be the RRC layer of the UE.

In step S120, the MAC entity of the UE determines that the configured sidelink grant cannot fulfil a latency requirement from a PPPP. In step S130, the MAC entity of the UE reselects a sidelink resource. The reselection of the sidelink resource may be performed for each sidelink process configured for multiple transmissions based on sensing.

The reselecting the sidelink resource may include clearing the configured sidelink grant. Further, the reselecting the sidelink resource may include randomly selecting, with equal probability, an integer value in an interval between 5 and 15, and setting a value of a sidelink resource reselection counter to the selected integer value. Further, the reselecting the sidelink resource may include selecting a number of HARQ retransmissions from allowed numbers configured by the upper layer in allowedRebcNumberPSSCH, and an amount of frequency resources within the range configured by the upper layer between minRB-NumberPSSCH and maxRB-NumberPSSCH. Further, the reselecting the sidelink resource may include selecting an integer value in an interval between 1 and 10 from allowed values configured by the upper layer in restrictResourceReservationPeriod, and setting a resource reservation interval by multiplying 100 with the selected integer value. Further, the reselecting the sidelink resource may include randomly selecting time and frequency resources for transmission opportunities of SCI and SL-SCH corresponding to a number of transmissions of MAC PDUs with the resource reservation interval from the resource pool, excluding resources indicated by a physical layer.

3. Parallel Allocation for Transmission of a Plurality of MAC PDUs and a Single MAC PDU Meanwhile, according to the above-described conventional method for SL grant reception and SCI transmission, it is not clear that multiple transmissions and a single transmission are allowed to be allocated in parallel. A vehicle may transmit a periodic message and a periodic message (for example, DENM) triggered by an event. In this case, the vehicle is likely to allocate both the multiple transmissions and the single transmission. Thus, according to an embodiment of the present invention, it may be suggested that the UE allocates both the multiple transmissions and the single transmission in SL mode 4.

However, when an exceptional resource pool is configured through random selection, it is obvious that the UE randomly allocate a single opportunity. This does not mean that SL transmission in a plurality of SL procedures is not allowed in an exceptional resource pool by random selection. That is, according to an embodiment of the present invention, when the exceptional resource pool is configured through random selection, it may be suggested that the UE allocates one of the multiple transmissions and the single transmission.

4. Much Shorter Resource Reservation Period for SL

In PC5-based V2V communication, traffic of a short period using a much shorter resource reservation period may be supported. Regarding this, latency requirements for V2X communication is provided as below.

E-UTRA(N) needs to be able to transmit a message with a latency up to 100 ms by itself or using an RSU between two UEs supporting a V2V/P application.

In a specific use example (for example, sensing before a collision), E-UTRA(N) needs to be able to transmit a message with a latency of 20 ms at maximum between two UEs supporting a V2X application.

E-UTRA(N) needs to be able to transmit a message with a latency of 100 ms between a UE supporting a V2I application and an RSU.

Considering the above latency requirements, not just 100 ms but also 20 ms should be supported as the maximum latency for SL communication.

Meanwhile, according to the above-described conventional method for SL grant reception and SCI transmission, the UE selects an integer value between [1, 10] from allowed values that are configured in restrictResourceReservationPeriod by a higher layer, and sets a resource reservation period by multiplying the selected value by 100. That is, 100 ms, 200 ms . . . 1000 ms may be supported as the current resource reservation period. This means that the latency requirement of 20 ms cannot be satisfied as the current resource reservation period.

In some cases, a resource reservation period needs to be calculated by multiplying a value selected between [1, 10] by 20. That is, in order to set a resource reservation period, a value by which the integer value between [1, 10] is multiplied needs to be set to a variable rather than an integer. Thus, according to an embodiment of the present invention, in order to set a resource reservation period, it may be suggested to change the value, by which the integer value between [1, 10] is multiplied, from 100 to a variable RSV_INTERVAL. The value of RSV_INTERVAL may be set to 20 ms or 100 ms. Then, the UE may select an integer value between [1, 10], and set a resource reservation period by multiplying the selected value by RSV_INTERVAL. "10" between [1, 10] is merely an example, and a greater integer value may be set. Accordingly, additional resource reservations such as 20 ms, 40 ms, 60 ms . . . and so on may be further supported in addition to the current resource reservation period of 100 ms, 200 ms . . . 1000 ms.

Meanwhile, as described above, a PDB may be considered as a latency requirement from the application layer. The latency may be derived from PPPP by the AS layer, which is based on the mapping between the PPPP and latency provided by configuration. That is, a latency of 20 ms may be derived from the PPPP by the AS layer. Accordingly, each SL logical channel has a PPPP associated therewith, and thus, the UE may configure one or more logical channels having a latency 100 ms, or one or more logical channels having a latency of 20 ms.

In addition, according to an embodiment of the present invention, with respect to multiple transmissions of a plurality of MAC PDUs, it may be suggested to derive a variable RSV_INTERVAL from a PPPP related to an MAC PDU to be transmitted. In this case, multiple transmission opportunities reserved together with resource reservation periods may be used for an STCH associated with the PPPP. Briefly, according to an embodiment of the present invention, in order for a resource reservation period regarding multiple transmissions of a plurality of MAC PDUs to certainly satisfy a latency requirement derived from a PPPP associated with an MAC PDU or a PPPP associated with an STCH, the UE may derive the variable RSV_INTERVAL from a PPPP associated with an STCH in which an MAC PDU to be transmitted exists Accordingly, the conventional method for SL grant reception and SCI transmission may be changed as shown in Table 4.

TABLE 4

...
1> else, if the MAC entity is configured by upper layers to transmit based on sensing using a pool of resources, the MAC entity selects to create a configured sidelink grant corresponding to transmissions of multiple MAC PDUs, and data is available in STCH, the MAC entity shall for each Sidelink process configured for multiple transmissions based on sensing:
2> if SL_RESOURCE_RESELECTION_COUNTER = 0 and the MAC entity randomly selects, with equal probability, a value in the interval [0, 1] which is above the probability configured by upper layers in probResourceKeep; or
2> if the configured sidelink grant cannot accommodate a RLC SDU by using the maximum allowed MCS configured by upper layers in maxMCS-PSSCH and the MAC entity selects not to segment the RLC SDU; or
2> if a pool of resources is configured or reconfigured by upper layers:
3> clear the configured sidelink grant, if available;
3> randomly select, with equal probability, an integer value in the interval [5, 15] and set SL_RESOURCE_RESELECTION_COUNTER to the selected value;
3> select the number of HARQ retransmissions from the allowed numbers configured by upper layers in allow edRebcNumberPSSCH, and an amount
of frequency resources within the range configured by upper layers between minRB-NumberPSSCH and maxRB-NumberPSSCH;
3> select an integer value in the interval [1, 10] from the allowed values configured by upper layers in restrictResourceReservationPeriod and the PPPP associated with the MAC PDUs (or the PPPP associated with the STCH) and set the resource reservation interval by multiplying the selected value with RSV INTERVAL which is set to either 20 or 100 based on the PPPP associated with the MAC PDUs (or the PPPP associated with the STCH) (If the MAC PDUs have different PPPP levels, UE selects the highest PPPP among them. UE needs to select an integer value and the RSV_INTERVAL based on the delay requirement (Packet Delay Budget) derived from the PPPP associated with the MAC PDUs or the PPPP associated with the STCH);
3> randomly select the time and frequency resources for transmission opportunities of SCI and SL-SCH corresponding to the number of transmissions of MAC PDUs with the resource reservation interval from the resource pool, excluding the resources indicated by the physical layer. The random function shall be such that each of the allowed selections can be chosen with equal probability;
3> if the number of HARQ retransmissions is equal to 1 and there are available resources, except the resources already excluded by the physical layer for more transmission opportunities:
4> randomly select the time and frequency resources for the other transmission opportunities of SCI and SL-SCH corresponding to the number of additional transmissions of the MAC PDUs with the resource reservation interval from the available resources. The random function shall be such that each of the allowed selections can be chosen with equal probability;
4> consider a set of transmission opportunities which comes first in time as the selected sidelink grant and a set of transmission opportunities which comes later in time as the retransmission opportunities;
3> else:
4> consider the set as the selected sidelink grant;
3> use the selected sidelink grant to determine the set of subframes in which transmissions of SCI and SL-SCH occur;
3> consider the selected sidelink grant to be a configured sidelink grant;
2> else if SL_RESOURCE_RESELECTION_COUNTER = 0 and the MAC entity randomly selects, with equal probability, a value in the interval [0, 1] which is less than or equal to the probability configured by upper layers in probResourceKeep:
3> clear the configured sidelink grant, if available;
3> randomly select, with equal probability, an integer value in the interval [5, 15] and set SL_RESOURCE_RESELECTION_COUNTER to the selected value;
3> use the previously selected sidelink grant for the number of transmissions of the MAC PDUs with the resource reservation interval to determine the set of subframes in which transmissions of SCI and SL-SCH occur;
3> consider the selected sidelink grant to be a configured sidelink grant;
...

Figure 5:
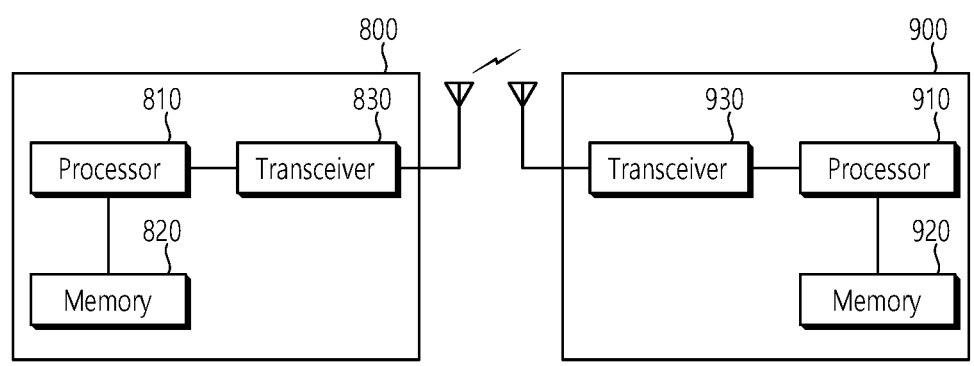
FIG. 5 shows a wireless communication system to implement an embodiment of the present invention.

FIG. 5 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a media access control (MAC) entity of a user equipment (UE) in a wireless communication system, the method comprising:
based on the MAC entity being configured by an upper layer to transmit using a pool of resources, creating a configured sidelink grant that corresponds to transmissions of multiple MAC protocol data units (PDUs);
determining that there is data for a vehicle-to-everything (V2X) communication in a sidelink traffic channel (STCH) associated with the configured sidelink grant;
determining that first sidelink resources of the STCH associated with the configured sidelink grant do not fulfill a latency requirement for transmitting the data in the V2X communication according to a ProSe per-packet priority (PPPP);
selecting, from among the pool of resources, second sidelink resources for the transmissions of the multiple MAC PDUs based on determining that the first sidelink resources of the STCH do not fulfill the latency requirement; and transmitting the multiple MAC PDUs using the second sidelink resources.

2. The method of claim 1, wherein selecting the second sidelink resources is performed for each sidelink process that is configured for the transmissions of the multiple MAC PDUs.

3. The method of claim 1, wherein selecting the second sidelink resources comprises:
clearing the configured sidelink grant.

4. The method of claim 1, wherein selecting the second sidelink resources comprises:
randomly selecting, with equal probability, an integer value in an interval from 5 to 15, and
setting a value of a sidelink resource reselection counter to the selected integer value.

5. The method of claim 1, wherein selecting the second sidelink resources comprises:
selecting (i) a number of hybrid automatic repeat request (HARD) retransmissions from an allowed number that is configured by the upper layer in allowedRebcNumberPSSCH, and (ii) an amount of frequency resources within a range that is configured by the upper layer from minRB-NumberPSSCH to maxRB-NumberPSSCH.

6. The method of claim 1, wherein selecting the second sidelink resources comprises:
selecting an integer value in an interval from 1 to 10, from among allowed values that are configured by the upper layer in restrictResourceReservationPeriod, and
setting a resource reservation interval by multiplying 100 with the selected integer value.

7. The method of claim 6, wherein selecting the second sidelink resources comprises:
randomly selecting, from among the pool of resources, time resources and frequency resources for transmission opportunities of sidelink control information (SCI) and sidelink shared channel (SL-SCH) corresponding to a number of the transmissions of the multiple MAC PDUs with the resource reservation interval, excluding resources that are indicated by a physical layer.

8. The method of claim 1, wherein the upper layer is a radio resource control (RRC) layer of the UE.

9. The method of claim 1, wherein selecting the second sidelink resources is performed based on sensing using the pool of resources.

10. The method of claim 1, wherein selecting the second sidelink resources is performed so as to fulfill the latency requirement for transmitting the data in the V2X communication according to the PPPP.

11. A user equipment (UE) configured to operate in a wireless communication system, the UE comprising:
a transceiver;
at least one processor; and
at least one computer memory operably connectable to the at least one processor and storing instructions that, when executed by the at least one processor, perform operations that comprise:
based on a media access control (MAC) entity of the UE being configured by an upper layer to transmit using a pool of resources, creating a configured sidelink grant that corresponds to transmissions of multiple MAC protocol data units (PDUs);
determining that there is data for a vehicle-to-everything (V2X) communication in a sidelink traffic channel (STCH) associated with the configured sidelink grant;
determining that first sidelink resources of the STCH associated with the configured sidelink grant do not fulfill a latency requirement for transmitting the data in the V2X communication according to a ProSe per-packet priority (PPPP);
selecting, from among the pool of resources, second sidelink resources for the transmissions of the multiple MAC PDUs based on determining that the first sidelink resources of the STCH do not fulfill the latency requirement; and
transmitting the multiple MAC PDUs using the second sidelink resources.

12. The UE of claim 11, wherein selecting the second sidelink resources is performed for each sidelink process that is configured for the transmissions of the multiple MAC PDUs.

13. The UE of claim 11, wherein selecting the second sidelink resources comprises:
clearing the configured sidelink grant.

14. The UE of claim 11, wherein selecting the second sidelink resources comprises:
randomly selecting, with equal probability, an integer value in an interval from 5 to 15, and
setting a value of a sidelink resource reselection counter to the selected integer value.

15. The UE of claim 11, wherein selecting the second sidelink resources comprises:
selecting (i) a number of hybrid automatic repeat request (HARD) retransmissions from an allowed number that is configured by the upper layer in allowedRetxNumberPSSCH, and (ii) an amount of frequency resources within a range that is configured by the upper layer from minRB-NumberPSSCH to maxRB-NumberPSSCH.

16. The UE of claim 11, wherein selecting the second sidelink resources comprises:
selecting an integer value in an interval from 1 to 10, from among allowed values that are configured by the upper layer in restrictResourceReservationPeriod, and
setting a resource reservation interval by multiplying 100 with the selected integer value.

17. The UE of claim 16, wherein selecting the second sidelink resources comprises:
randomly selecting, from among the pool of resources, time resources and frequency resources for transmission opportunities of sidelink control information (SCI) and sidelink shared channel (SL-SCH) corresponding to a number of the transmissions of the multiple MAC PDUs with the resource reservation interval, excluding resources that are indicated by a physical layer.

18. The UE of claim 11, wherein the upper layer is a radio resource control (RRC) layer of the UE.

* * * * *

UNITED STATES PATENT AND TRADEMARK OFFICE
CERTIFICATE OF CORRECTION

PATENT NO. : 10,568,115 B2
APPLICATION NO. : 16/458715
DATED : February 18, 2020
INVENTOR(S) : Youngdae Lee and Jaewook Lee Page 1 of 1

It is certified that error appears in the above-identified patent and that said Letters Patent is hereby corrected as shown below:

On the Title Page

Item (56), Other Publications, Column 2, Line 14, after "36.321" delete "v13.2.1" and insert -- v13.2.0 --, therefor.

Signed and Sealed this
Seventh Day of July, 2020

Andrei Iancu
*Director of the United States Patent and Trademark Office*